Aug. 2, 1927.
R. B. MORROW
1,637,424
AGRICULTURAL IMPLEMENT
Filed March 9, 1926
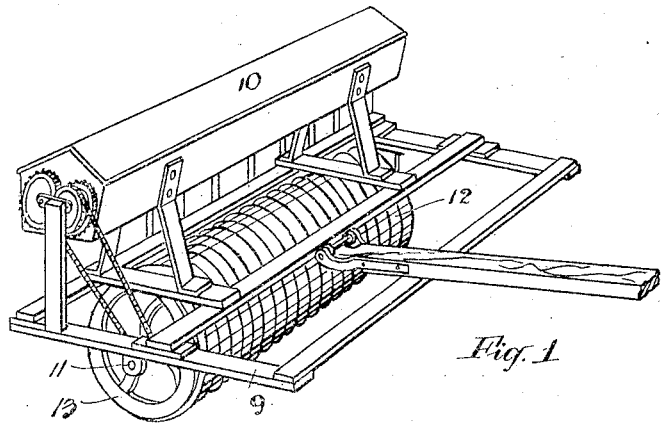
Fig. 1
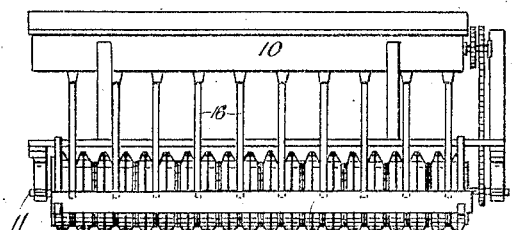
Fig. 2
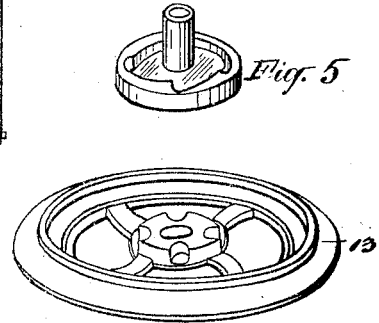
Fig. 5
Fig. 6
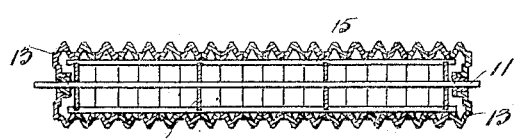
Fig. 3
Fig. 7
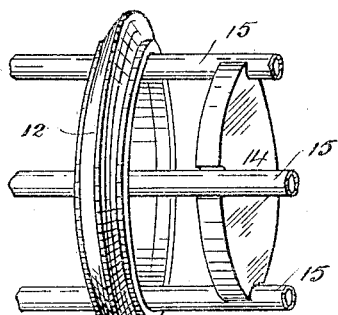
Fig. 4
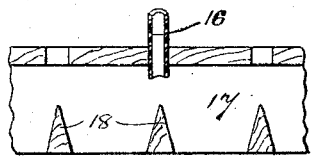
Fig. 8
R. B. Morrow
INVENTOR
By: Marks & Clerk
Attys Patented Aug. 2, 1927.

1,637,424

UNITED STATES PATENT OFFICE.

ROBERT BLAKE MORROW, OF BRUNSWICK, VICTORIA, AUSTRALIA.

AGRICULTURAL IMPLEMENT.

Application filed March 9, 1926, Serial No. 93,517, and in Australia May 6, 1925.

This invention relates to machines for breaking up earth clods to prepare cultivated ground for the seed. It further provides a light machine that is capable, while so disintegrating the soil, of forming grooves or drills therein into which the seed and manure is deposited from seed sowing means.

A feature of the improved machine is its novel construction and lightness of draft and I have attached thereto below the seed and manure tubes a convenient device for distributing the materials sown into the drills.

According to the invention, a clod crushing roller, that is preferably made up of a number of V-shaped rings, is adapted to revolve about the machine axle in contact with anti-friction rollers supported on the axle. Means are provided for communicating the axle movements to the seed box mechanism, all of which will now be fully described with reference to the accompanying drawings, in which Fig. 1 is a perspective view of the improved machine.

Fig. 2 shows same in rear elevation.

Fig. 3 illustrates in longitudinal section the construction of the roller.

Fig. 4 is a perspective view of one of the rings composing the roller and showing part of the anti-friction means supporting the rings.

Fig. 5 is a like view of the inner part of a clutch or locking member for driving the axle from the grounded end members.

Fig. 6 is a similar view of an end member.

Fig. 7 shows such member in transverse sectional elevation, and

Fig. 8 is a detail sectional view of part of the seed and manure distributing box.

The clod crusher or roller is contained in a suitable frame 9 over which the seed and manure box 10 is mounted. An axle 11 is supported in the frame and about the axle but out of contact therewith are a number of rings 12 placed side by side to form what is equivalent to a Cambridge roller, the peripheries of the rings being V-shaped and slightly blunted.

The end members 13 are flanged wheels with spokes and boss on the axle 11 and are fitted with the free wheel movement illustrated in Figs. 5 and 6 in order to rotate the axle to convey movement to the seed box mechanism through the sprocket and chain gearing, if the machine be fitted with a seed box. If, on the other hand, the implement is to be used only as a clod crusher all the members composing the same may be rings as in Fig. 4.

The free wheel mechanism in Figs. 5 and 6 permits of the seeding means being driven only when the wheels are proceeding in a forward direction but not if the direction is reversed. In small machines, there will be a driving wheel 13 at each end but in large implements an additional driving wheel or wheels may be placed midway in the roller.

At intervals on the axle 11 are discs 14 of wood or other suitable material the peripheries of which are notched to receive several lengths of piping 15 that run throughout the machine. These pipes or bars are free to revolve on the discs and with the same about the axle as the rings roll over the ground. The rings 12 are directly supported on the pipes 15 which offer little resistance to the moving rings, while the whole construction will present a light and compact machine for rolling over the ground for the purposes indicated.

The rings 12 are formed V-shaped and are slightly flattened at the apex of the V to press into the ground to form a channel or drill as the machine is drawn forward. Into this channel the seed and manure from the box 10 is conveyed through the flexible tubes 16 and the distributor box 17. The tubes enter the box immediately over inverted V-shaped cross members 18 and as the materials fall thereon the mixture is deflected by the members 18 partly into parallel and adjacent drills. A slat or light harrow may be trailed behind the box 17 to cover the seed that has been sown.

The distance between the apices of the rings is about three and one-half inches while the seed tubes 16 are spaced about seven inches apart; thus the materials will fall through the tubes in a line midway between the drills but will be turned into parallel and adjacent grooves by the parts 18.

It will be observed that by using the rings on the anti-friction rollers 15 much metal is saved and the weight of the implement reduced. Such would still be the case if, instead of the plurality of rings 12 the crusher be made of a single cylinder supported on the rollers. For convenience of operation, however, it is preferred to employ the rings 12 to compose the roller.

The machine may be mounted on the ordinary transport wheels and in that case will be fitted with any convenient means for lifting the machine off the ground during transport.

Having now described my invention what I claim as new and desire to secure by Letters Patent is:—

1. In a machine of the character described, in combination a frame, an axle journalled therein, a plurality of discs fastened at spaced intervals on said axle, a rotatable bar in the peripheries of the disc, and a sectional roller rotatably mounted on said bars and including a plurality of rings.

2. In a machine of the character described, in combination a frame, an axle journalled therein, a plurality of discs arranged at suitably spaced intervals on said axle and provided in the peripheries with alining notches, a plurality of elongated bars constituting roller bearings arranged in the alining peripheries of the discs in parallel with the axle, and a crushing roller rotatably mounted on said bars including a plurality of rings, the end rings being in the form of wheels and secured to said shaft and all of said rings having U-shaped peripheral portions, substantially as and for the purposes set forth.

In testimony whereof I have signed my name to this specification.

ROBERT BLAKE MORROW.